US012640378B2

(12) United States Patent
Lim

(10) Patent No.: US 12,640,378 B2
(45) Date of Patent: May 26, 2026

(54) COOLING APPARATUS OF FUEL CELL VEHICLE

(71) Applicants: HYUNDAI MOTOR COMPANY, Seoul (KR); KIA CORPORATION, Seoul (KR)

(72) Inventor: Seung Taek Lim, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 948 days.

(21) Appl. No.: 17/831,686

(22) Filed: Jun. 3, 2022

(65) Prior Publication Data

US 2023/0011881 A1 Jan. 12, 2023

(30) Foreign Application Priority Data

Jul. 7, 2021 (KR) ......................... 10-2021-0089375

(51) Int. Cl.
| | |
|---|---|
| *H01M 8/04014* | (2016.01) |
| *B60L 50/75* | (2019.01) |
| *B60L 58/40* | (2019.01) |
| *H01M 8/04119* | (2016.01) |
| *H01M 8/04701* | (2016.01) |
| *H01M 8/04828* | (2016.01) |
| *H01M 10/613* | (2014.01) |
| *H01M 10/625* | (2014.01) |

(Continued)

(52) U.S. Cl.
CPC ......... *H01M 8/04014* (2013.01); *B60L 50/75* (2019.02); *B60L 58/40* (2019.02); *H01M 8/04134* (2013.01); *H01M 8/04701* (2013.01);

*H01M 8/04843* (2013.01); *H01M 10/613* (2015.04); *H01M 10/625* (2015.04); *H01M 10/6563* (2015.04); *H01M 16/006* (2013.01); *H01M 2220/20* (2013.01); *H01M 2250/20* (2013.01)

(58) Field of Classification Search
CPC ........... H01M 10/6563; H01M 10/613; H01M 10/625; H01M 16/006; H01M 8/04843; H01M 8/04701; H01M 8/04014
See application file for complete search history.

(56) References Cited

U.S. PATENT DOCUMENTS

2022/0088990 A1 * 3/2022 Kim ................... B60H 1/32284

FOREIGN PATENT DOCUMENTS

| EP | 4102601 B1 * | 5/2024 | .......... H01M 8/0606 |
|---|---|---|---|
| KR | 10-2006-0068173 A | 6/2006 | |

(Continued)

OTHER PUBLICATIONS

Office Action issued in corresponding Korean Patent Application No. 10-2021-0089375 dated Nov. 16, 2025, with English translation.

(Continued)

*Primary Examiner* — Sarah A. Slifka
(74) *Attorney, Agent, or Firm* — MORGAN, LEWIS & BOCKIUS LLP

(57) ABSTRACT

Disclosed is a cooling apparatus of a fuel cell vehicle, including an air supply part, an air conditioning part that cools air discharged from the air supply part, and a valve provided at a rear end of the air supply part and that communicates cooled air discharged from the air supply part with a fuel cell part or a battery.

7 Claims, 4 Drawing Sheets

(51) Int. Cl.
_H01M 10/6563_     (2014.01)
_H01M 16/00_     (2006.01)

(56)            References Cited

FOREIGN PATENT DOCUMENTS

| | | |
|---|---|---|
| KR | 10-2020-0045363 A | 5/2020 |
| WO | 2017/102619 | 6/2017 |

OTHER PUBLICATIONS

Notice of Allowance issued in corresponding Korean Priority Application No. 10-2021-0089375 dated Apr. 1, 2026, with English translation.

* cited by examiner

COOLING APPARATUS OF FUEL CELL VEHICLE

CROSS-REFERENCE TO RELATED APPLICATION

This application claims the benefit of priority to Korean Patent Application No. 10-2021-0089375, filed in the Korean Intellectual Property Office on Jul. 7, 2021, the entire contents of which are incorporated herein by reference.

TECHNICAL FIELD

The present disclosure relates to a cooling apparatus of a fuel cell vehicle.

BACKGROUND

In general, an air compressor is used to constitute a fuel cell system with a variable voltage, and a battery is additionally used to assist an output of a fuel cell and store electric power during regenerative braking.

Conventionally, a blower is used as an air cooling apparatus for maintaining the battery at 50° C. or less, and the battery is cooled through free convection without using a blower at an exterior temperature of 35° C. Accordingly, when a fuel cell is operated in a general road condition of a room temperature, it is unnecessary to cool the battery.

However, the blower is always operated to prepare for a time, such as a sudden acceleration, at which a temperature of the battery is increased abnormally with an instantaneous high output. Furthermore, because exterior air is suctioned, an air filter for a battery is separately installed.

Because the air compressor compresses air and a temperature of the discharged air is high, the air is cooled again by a water cooling type air cooler. However, because a temperature of cooling water is about 70° C., it is impossible to cool the air to the temperature, and the air cooler is not suitable for the purpose of cooling the battery.

In addition, it is ideal that the compressor of the air conditioning system compresses a gas of a low temperature and a low pressure, but may compress humid vapor according to a situation, and a liquid in the worst case. This is an element that deteriorates a durability of the compressor, and occasionally, becomes a cause of damage to an internal component of the compressor.

SUMMARY

The present disclosure has been made to solve the above-mentioned problems occurring in the prior art while advantages achieved by the prior art are maintained intact.

An aspect of the present disclosure provides a cooling apparatus of a fuel cell vehicle that constitutes a battery air-cooling structure by combining an air compressor of a fuel cell and an air conditioning system.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a cooling apparatus of a fuel cell vehicle may include an air supply part, an air conditioning part that cools air discharged from the air supply part, and a valve disposed downstream of the air supply part and that communicates cooled air discharged from the air supply part with at least one of a fuel cell part and a battery.

According to an embodiment, the air supply part may include an air compressor that compresses suctioned air, and an air cooler connected to a refrigerant line of the air conditioning part and that cool air discharged from the air compressor.

According to an embodiment, the air conditioning part may include a compressor that compresses a refrigerant in a gas state, which is discharged from an evaporator, a condenser that condenses the refrigerant in the gas state, which is compressed by the compressor, and liquefy the refrigerant in the gas state into a liquid state, an expansion valve that expands the refrigerant in the liquid state, which is discharged from the condenser, to the gas state, and the evaporator that evaporates the refrigerant in the gas state, which is expanded through the expansion valve, through heat exchange with air, and decrease a temperature of the air cooler.

According to an embodiment, the fuel cell part may include a fuel cell stack that produces electric power by bringing hydrogen that is a fuel and air that is an oxidizer into reaction with each other, and a humidifier that supplies humidified air, which is obtained by exchanging moisture between the cooled air discharged from the air supply part and air discharged from the fuel cell stack, to the fuel cell stack.

According to an embodiment, the valve may be a 3-way valve, in which a first direction inlet is communicated with the air supply part, a second direction inlet is communicated with the battery, and a third direction inlet is communicated with the fuel cell part.

According to an embodiment, the valve may be configured such that the cooled air discharged from the air supply part is supplied to the battery and the fuel cell part at the same time when the first direction inlet, the second direction inlet, and the third direction inlet are all in an opened state.

According to an embodiment, the valve may be configured such that supply of the cooled air to the battery is interrupted and the cooled air is supplied only to the fuel cell part when the first direction inlet and the third direction inlet are in an opened state and the second direction inlet is in a closed state.

According to an embodiment, the valve may be configured such that supply of the cooled air to the fuel cell part is interrupted and the cooled air is supplied only to the battery when the first direction inlet and the second direction inlet are in an opened state and the third direction inlet is in a closed state.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
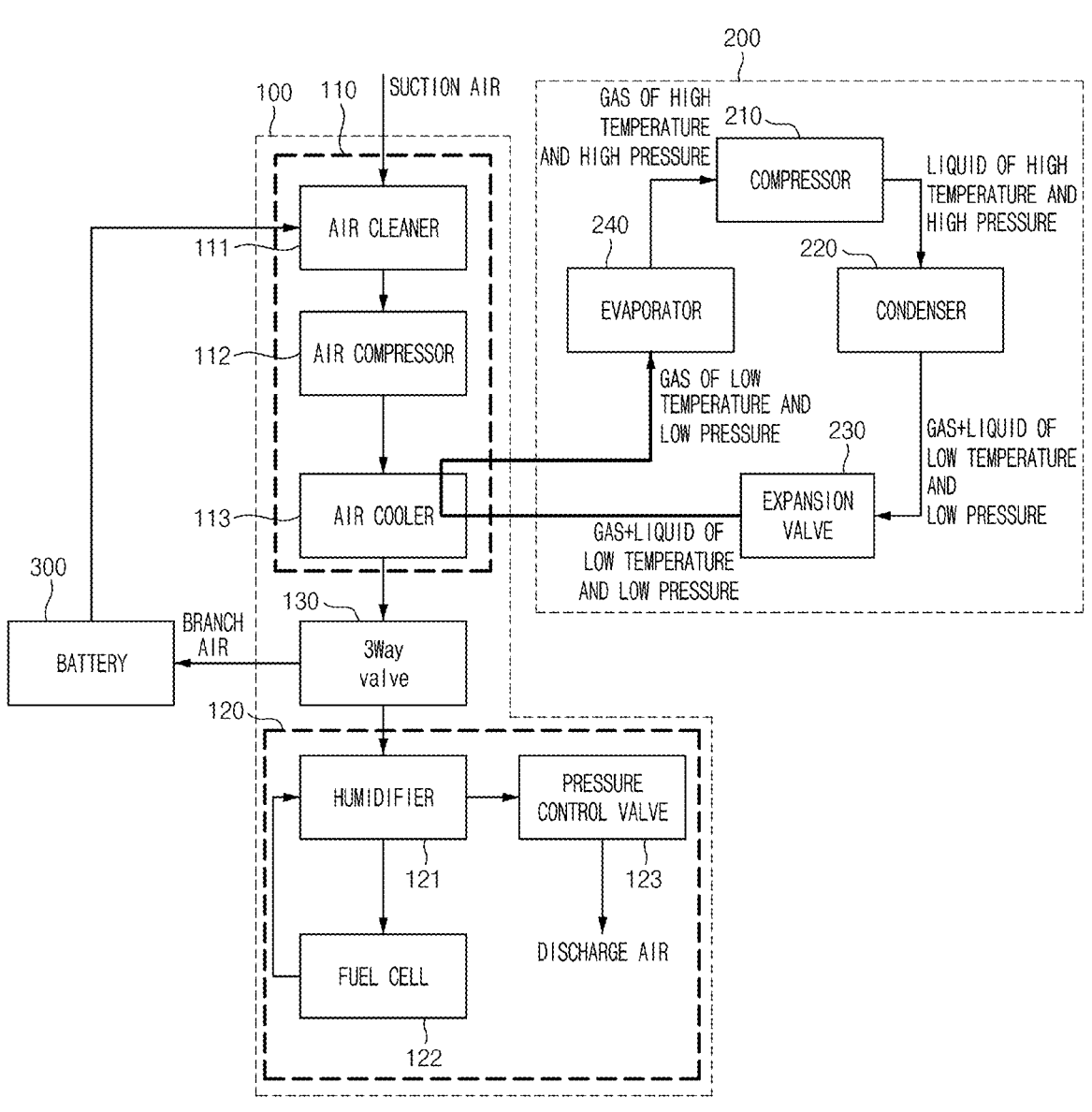
FIG. 1 is a block diagram illustrating a cooling apparatus of a fuel cell vehicle according to an embodiment of the present disclosure.

Hereinafter, various embodiments of the present disclosure will be described with reference to the accompanying drawings. Accordingly, those of ordinary skill in the art will recognize that modifications, equivalents, and/or alternatives on the various embodiments described herein can be variously made without departing from the scope and spirit of the present disclosure.

Various embodiments of the present disclosure and the terms used herein do not limit the technical features described in the present disclosure to specific embodiments, and should be construed to include various modifications, equivalents, or replacements of the embodiments.

With regard to the description of drawings, similar components may be denoted by similar reference numerals. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one or all possible combinations of the items enumerated together in a corresponding one of the phrases.

As used herein, such terms as "1st" and "2nd" or "first" and "second" may be used to simply distinguish a corresponding component from another, and does not limit the components in other aspects (e.g., an importance or an order). It is to be understood that if an element (e.g., a first element) is referred to, with or without the term "operatively" or "communicatively", as "coupled with" or "connected with", it means that the element may be coupled with the other element directly (e.g., by wire), wirelessly, or via a third element.

Figure 2:
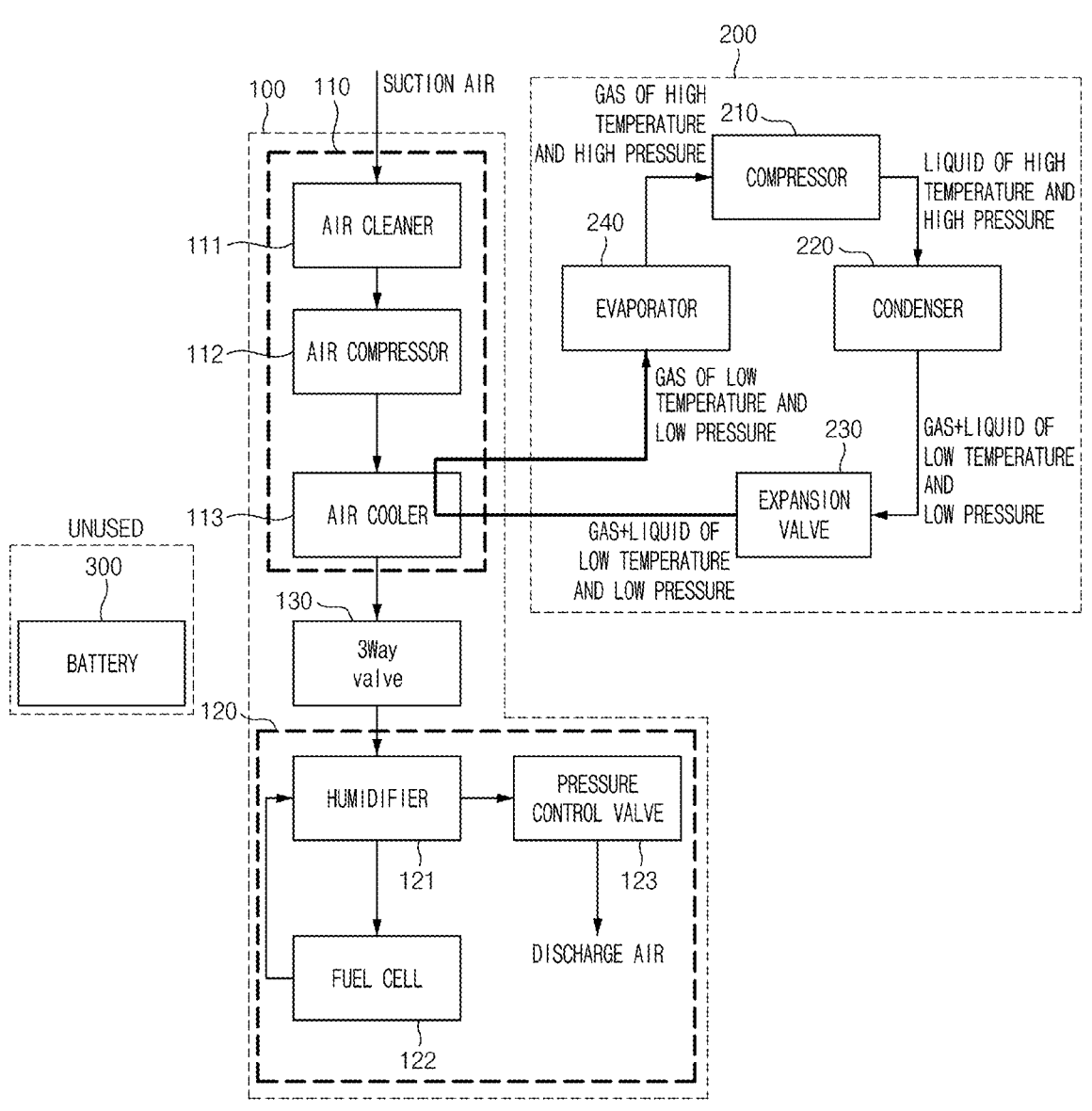
FIGS. 2 to 4 are block diagrams illustrating a cooling apparatus of a fuel cell vehicle according to another embodiment of the present disclosure.
Figure 3:
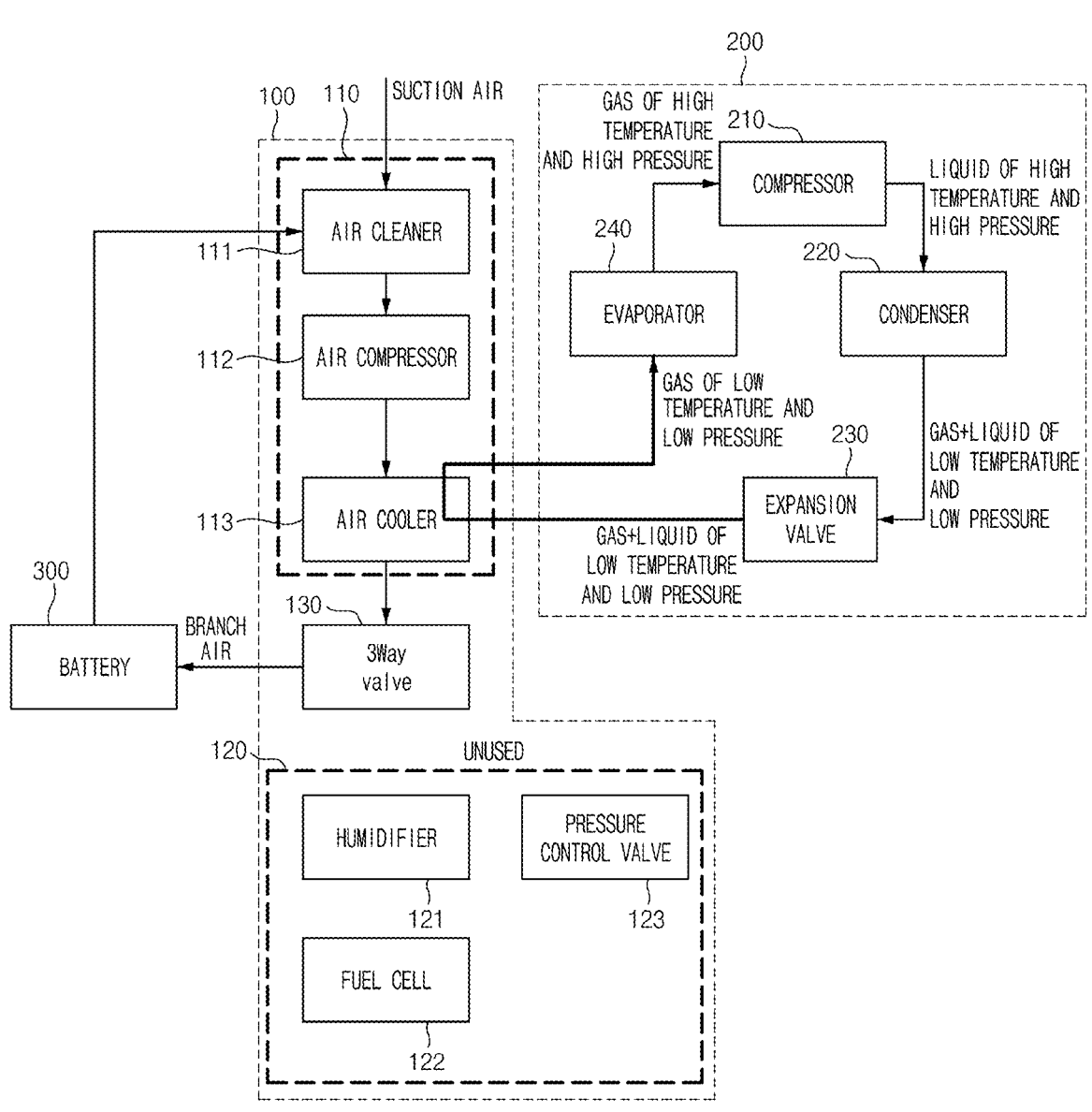
Figure 4:
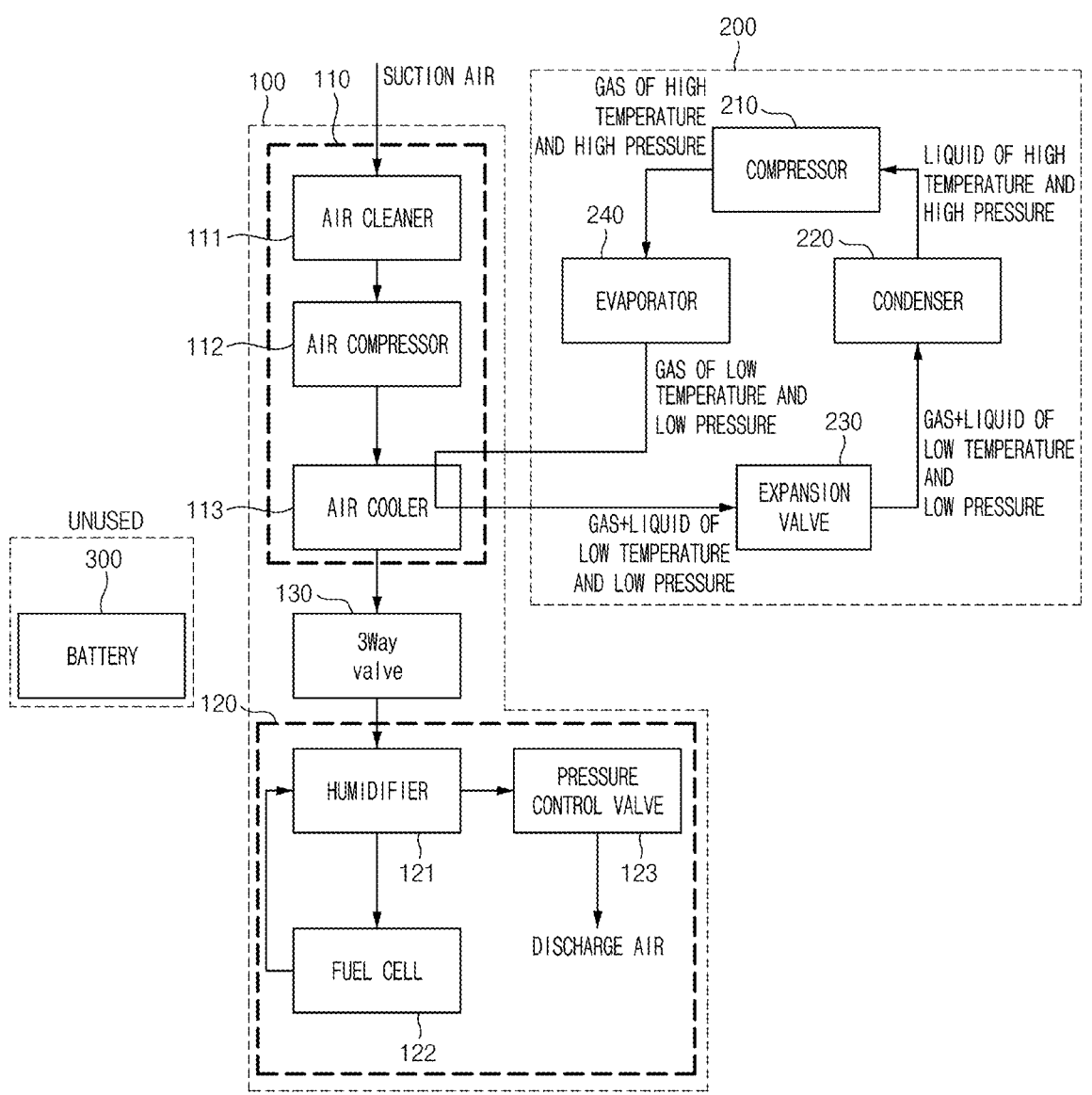

FIG. 1 is a block diagram illustrating a cooling apparatus of a fuel cell vehicle according to an embodiment of the present disclosure. FIGS. 2 to 4 are block diagrams illustrating a cooling apparatus of a fuel cell vehicle according to another embodiment of the present disclosure.

Referring to FIG. 1, a cooling apparatus of a fuel cell vehicle according to an embodiment of the present disclosure may include an air supply part 110, a fuel cell part 120, a branch valve 130, and an air conditioning part 200.

The air supply part 110 is adapted to suction exterior air and supply the exterior air to the fuel cell part 120, and may include an air cleaner 111, an air compressor 112, and an air cooler 113.

The air cleaner 111 may filter out foreign substances, such as dust, from the suctioned exterior air.

The air compressor 112 may compress such that the air discharged through the air cleaner 111 has a sufficient pressure, by which the air may pass through an interior passage of the fuel cell part 120. The air compressor 112 may change a pressure of the compressed air in a specific range.

The air cooler 113 may cool the compressed air discharged from the air compressor 112.

The compressed air discharged from the air compressor 112 is in a state, in which a temperature thereof is increased, and a performance of the fuel cell part 120 may be deteriorated when the compressed air is introduced into the fuel cell part 120 at a high temperature.

Accordingly, the performance of the fuel cell part 120 may be prevented from being deteriorated, by supplying the compressed air discharged from the air compressor 112 after the temperature of the compressed air is decreased.

The fuel cell part 120 may include a humidifier 121, a fuel cell stack 122, and a pressure control valve 123.

The humidifier 121 may supply humidified air, which is obtained by exchanging moisture between the compressed air discharged from the air cooler 113 and the air discharged from the fuel cell stack 122, to the fuel cell stack 122.

The humidifier 121 may receive and humidify the compressed air cooled by the air cooler 113, and supply the humidified compressed air to the fuel cell stack 122. That is, the humidifier 121 may humidify the cooled compressed air before the cooled compressed air discharged from the air cooler 113 is introduced into the fuel cell stack 122.

The fuel cell stack 122 has to be maintained at a specific humidity or more for a chemical reaction, and to achieve this, the humidifier 121 may humidify through exchange moisture between the discharged air discharged from an air electrode of the fuel cell stack 122 and the cooled compressed air discharged from the air cooler 113 and supply the humidified air to the air electrode of the fuel cell stack 122.

Meanwhile, exhaust air that fails to participate in humidification in the humidifier 121 and then is discharged may be exhausted to an outside while containing moisture, and a pressure of the exhaust air may be adjusted to a pressure set by the pressure control valve 123 and then be exhausted to the outside.

The fuel cell stack 122 may produce electric power through an electrochemical reaction of hydrogen that is a fuel and air containing oxygen that is an oxidizer as fuel cells each including a separator, and a pair of electrodes, that is, a cathode electrode and an anode electrode that are disposed on opposite sides of the separator are stacked therein.

The air conditioning part 200 may include a compressor 210, a condenser 220, an expansion valve 230, and an evaporator 240.

The compressor 210 may be connected to the evaporator 240 through a refrigerant pipeline, and may compress the refrigerant in a gas state of a low temperature and a low pressure, which is discharged from the evaporator 240, into the refrigerant in a gas state of a high temperature and a high pressure.

The condenser 220 may be connected to the compressor 210 through a refrigerant pipeline, and may liquefy the refrigerant in the gas state of the high temperature and the high pressure, which is discharged from the compressor 210, into the refrigerant in a liquid state of a high temperature and a high pressure.

The expansion valve 230 may be connected to the condenser 220 through a refrigerant pipeline, and may expand the refrigerant in the liquid state of the high temperature and the high pressure, which is discharged from the condenser 220, into the refrigerant in a gas state of a low temperature and a low pressure.

The evaporator 240 may be connected to the expansion valve 230 through a refrigerator pipeline, and may evaporate the refrigerant in the gas state of the low temperature and the low pressure, which is expanded through the expansion valve 230, through exchange of heat with exterior air.

Accordingly, an interior of the vehicle may be cooled by supplying the exterior air introduced from an outside into the interior of the vehicle after the exterior air exchanges heat with the refrigerant in the gas state of the low temperature and the low pressure through the evaporator 240 to be cooled.

In addition, the refrigerant pipeline between the evaporator 240 and the compressor 210 may be connected to the air cooler 113 whereby a temperature of the air cooler 113 may be decreased.

Accordingly, the compressed air discharged from the air compressor 112 may be cooled to a lower temperature while passing through the air cooler 113, to which the refrigerant pipeline is connected.

In this way, the air cooler 113 may cool the compressed air discharged from the air compressor 112, through the refrigerant pipeline, even though a separate cooling apparatus is not provided.

The branch valve 130 may be provided at a rear end of the air supply part 110 to communicate the cooled air discharged from the air cooler 113 with the fuel cell part 120 or the battery 300.

The battery 300 may supply electric power to a motor (not illustrated) that drives the vehicle and electric components (not illustrated).

The branch valve 130 may be a 3-way valve, in which the first direction inlet is communicated with the air cooler 113 of the air supply part 110, the second direction inlet is communicated with the battery 300, and the third direction inlet is communicated with the humidifier 121 of the fuel cell part 120.

When the first direction inlet, the second direction inlet, and the third direction inlet of the branch valve 130 are all in opened states, the cooled air discharged from the air cooler 113 may be supplied to the battery 300 and the humidifier 121 at the same time.

Accordingly, the battery 300 may be efficiently cooled as the cooled air of the low temperature, which is cooled by the air conditioning part 200, is introduced into the battery 300 through the passages due to the first direction inlet and the second direction inlet of the branch valve 130.

In this way, the battery 300 may be cooled through the cooled air discharged from the air cooler 113 even though a separate cooling apparatus is not provided.

In addition, the fuel cell part 120 may be operated with an optimum performance as the cooled air of the low temperature, which is cooled by the air conditioning part 200, is introduced into the humidifier 121 through the passages due to the first direction inlet and the third direction inlet of the branch valve 130.

Meanwhile, the vehicle may be driven only with the electric power produced by the fuel cell part 120 while the vehicle travels.

Referring to FIG. 2, when the first direction inlet and the third direction inlet of the branch valve 130 is in the opened states and the second direction inlet is in the closed state, the supply of the cooled air to the battery 300 may be interrupted and the cooled air discharged from the air cooler 113 may be supplied only to the fuel cell part 120 through the passages due to the first direction inlet and the third direction inlet.

In this way, because the entire cooled air discharged from the air cooler 113 is supplied to the fuel cell part 120, the fuel cell part 120 may be cooled more efficiently. Then, a cooling range of the fuel cell part 120 may be adjusted by adjusting opening degrees of the passages due to the first direction inlet and the third direction inlet.

In addition, when the vehicle is started or the vehicle travels, the production of electric power by the fuel cell part 120 may be stopped and the vehicle may be driven only with the electric power of the battery 300.

Referring to FIG. 3, when the first direction inlet and the second direction inlet of the branch valve 130 is in the opened states and the third direction inlet is in the closed state, the supply of the cooled air to the fuel cell part 120 may be interrupted and the cooled air discharged from the air cooler 113 may be supplied only to the battery 300 through the passages due to the first direction inlet and the second direction inlet.

In this way, because the entire cooled air discharged from the air cooler 113 is supplied to the battery 300, the battery 300 may be cooled more efficiently. Then, a cooling range of the battery 300 may be adjusted by adjusting opening degrees of the passages due to the first direction inlet and the second direction inlet.

Meanwhile, in the winter season, component, such as various valves that constitute the fuel cell part 120 may be frozen, whereby the operation of the fuel cell part 120 may not be smooth.

Referring to FIG. 4, a mode of the air conditioning part 200 may be switched to a heat pump mode, and heat may be generated in a refrigerant pipeline between the evaporator 240 and the compressor 210 due to the heat pump mode.

Accordingly, a temperature of the compressed air discharged from the air compressor 112 may be increased while the compressed air passes through the air cooler 113, to which the refrigerant pipeline is connected, and the fuel cell part 120 is preheated through the compressed air, the temperature of which is increased, whereby the components, such as the valves that constitutes the fuel cell part 120, may be melted.

In addition, although not illustrated in the drawings, according to the embodiments, the cooling apparatus of the fuel cell vehicle may include a controller.

The controller may control the elements of the cooling apparatus of the fuel cell vehicle, and may perform various data processing or calculations.

According to an embodiment, as at least a part of data processing or calculations, the controller may store a command or data received from another element (e.g., a sensor) in a volatile memory, may process a command or data stored in the volatile memory, and may store result data in the volatile memory.

According to an embodiment, the controller may include a main processor (e.g., a central processing device or an application processor), and an auxiliary processor (e.g., a graphic processing device, an image signal processor, a sensor hub processor, or a communication processor) which may be operated independently from or together with the main processor. For example, when the controller includes a main processor and an auxiliary processor, the auxiliary processor may be set to use lower electric power than the main processor or to be specified to a specific function. The auxiliary processor may be implemented separately from the main processor or as a part thereof.

In addition, although not illustrated in the drawings, according to the embodiments, the cooling apparatus of the fuel cell vehicle may include storage.

The storage may store instructions that control the cooling apparatus of the fuel cell vehicle, control instruction codes, control data, or user data. For example, the storage may include at least one of an application program, an operating system (OS), middleware, or a device driver.

The storage may include one or more of a volatile memory or a nonvolatile memory.

The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), and a ferroelectric RAM (FeRAM).

The nonvolatile memory may include a read only memory (ROM), a programmable ROM (PROM), an electrically programmable ROM (EPROM), an electrically erasable programmable ROM (EEPROM), and a flash memory.

The storage may further include a nonvolatile medium, such as a hard disk drive (HDD), a solid state disk (SSD), an embedded multimedia card (eMMC), and a universal flash storage (UFS).

Various embodiments of the present disclosure may be implemented by software (e.g., a program) including one or more instructions stored in a storage medium (e.g., an internal memory or an external memory) that may be read by a machine. For example, a device may call, among one or more instructions stored in a storage medium, at least one instruction, and may execute the instruction. This allows at least one function to be performed according to the called at least one instruction. The one or more instructions may include a code that is made by a compiler or a code that may be executed by an interpreter.

The storage medium that may be read by a device may be provided in a form of a non-transitory storage medium. Here, the 'non-transitory storage medium' means that the storage medium is a tangible device and does not include a signal (e.g., an electromagnetic wave), and with regard to the term, a case, in which data are semi-permanently stored in the storage medium, and a case, in which data are temporarily stored in the storage medium, are not distinguished.

According to an embodiment, the methods according to various embodiments of the present disclosure may be provided to be included in a computer program product. The computer program product may be traded between a seller and a purchaser. The computer program product may be distributed in a form of a storage medium that may be read by a device (e.g., a compact disk read only memory (CD-ROM) or may be distributed (e.g., downloaded or uploaded) through an application store or directly or online between two user devices. In the online distribution, at least a portion of the computer program product may be at least temporarily stored in a storage medium, such as a server of a manufacturer, a server of an application store, or a memory of a relay server, which may be read by a device, or temporarily generated.

According to various embodiments, elements (e.g., modules or programs) of the above-described elements may include one or a plurality of entities, and some of the plurality of entities may be disposed to be separated from the other elements.

According to various embodiments, among the above-described elements, one or more elements or operations may be omitted or one or more other elements or operations may be added.

Alternatively or additionally, the plurality of elements (e.g., modules or programs) may be integrated into one element. In this case, the integrated elements may perform one or more functions of the elements of the plurality of elements in a way that is the same as or similar to the functions performed by the corresponding elements of the plurality of elements before the integration.

According to various embodiments, the operations performed by modules, programs, or other elements may be executed sequentially, in parallel, repeatedly, or heuristically, one or more operations may be executed in another sequence or omitted, or one or more other operations may be added.

As described above, the present disclosure is adapted to constitute a battery air-cooling structure by combining an air compressor of a fuel cell and an air conditioning system, and may maximize a battery cooling effect by using a refrigerant of the air cooling system as a cooling fluid of an air cooler.

The above description is a simple exemplification of the technical spirits of the present disclosure, and the present disclosure may be variously corrected and modified by those skilled in the art to which the present disclosure pertains without departing from the essential features of the present disclosure.

Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the genuine technical scope of the present disclosure should be construed by the attached claims, and all the technical spirits within the equivalent ranges fall within the scope of the present disclosure.

What is claimed is:

1. A cooling apparatus of a fuel cell vehicle, comprising:
an air supply part;
an air conditioning part to cool air discharged from the air supply part; and
a valve disposed downstream of the air supply part and to communicate cooled air discharged from the air supply part with at least one of a fuel cell part and a battery, wherein the air supply part includes:
an air compressor to compress suctioned air; and
an air cooler connected to a refrigerant line of the air conditioning part and to cool air discharged from the air compressor.

2. The cooling apparatus of claim 1, wherein the air conditioning part includes:
a compressor to compress a refrigerant in a gas state, which is discharged from an evaporator;
a condenser to condense the refrigerant in the gas state, which is compressed by the compressor, and liquefy the refrigerant in the gas state into a liquid state;
an expansion valve to expand the refrigerant in the liquid state, which is discharged from the condenser, to the gas state; and
the evaporator to evaporate the refrigerant in the gas state, which is expanded through the expansion valve, through heat exchange with air, and decrease a temperature of the air cooler.

3. The cooling apparatus of claim 1, wherein the fuel cell part includes:
a fuel cell stack configured to produce electric power by bringing hydrogen that is a fuel and air that is an oxidizer into reaction with each other; and
a humidifier to supply humidified air, which is obtained by exchanging moisture between the cooled air discharged from the air supply part and air discharged from the fuel cell stack, to the fuel cell stack.

4. The cooling apparatus of claim 1, wherein the valve is a 3-way valve, in which a first direction inlet is communicated with the air supply part, a second direction inlet is communicated with the battery, and a third direction inlet is communicated with the fuel cell part.

5. The cooling apparatus of claim 4, wherein the valve is configured such that the cooled air discharged from the air supply part is supplied to the battery and the fuel cell part at the same time when the first direction inlet, the second direction inlet, and the third direction inlet are all in an opened state.

6. The cooling apparatus of claim 4, wherein the valve is configured such that supply of the cooled air to the battery is interrupted and the cooled air is supplied only to the fuel cell part when the first direction inlet and the third direction inlet are in an opened state and the second direction inlet is in a closed state.

7. The cooling apparatus of claim 4, wherein the valve is configured such that supply of the cooled air to the fuel cell part is interrupted and the cooled air is supplied only to the battery when the first direction inlet and the second direction inlet are in an opened state and the third direction inlet is in a closed state.

\* \* \* \* \*